US009389086B2

(12) United States Patent
Hashem et al.

(10) Patent No.: US 9,389,086 B2
(45) Date of Patent: Jul. 12, 2016

(54) TRANSPORTATION PLANNER AND ROUTE CALCULATOR FOR ALTERNATIVE TRAVEL METHODS

(71) Applicants: Heba Abdulmohsen Hashem, Alexandria, VA (US); Thieab Aldossary, Washington, DC (US)

(72) Inventors: Heba Abdulmohsen Hashem, Alexandria, VA (US); Thieab Aldossary, Washington, DC (US)

( * ) Notice: Subject to any disclaimer, the term of this patent is extended or adjusted under 35 U.S.C. 154(b) by 84 days.

(21) Appl. No.: 14/227,580

(22) Filed: Mar. 27, 2014

(65) Prior Publication Data

US 2015/0276419 A1    Oct. 1, 2015

(51) Int. Cl.
*G01C 21/20*    (2006.01)

(52) U.S. Cl.
CPC ...................................... *G01C 21/20* (2013.01)

(58) Field of Classification Search
None
See application file for complete search history.

(56) References Cited

U.S. PATENT DOCUMENTS

| | | | | |
|---|---|---|---|---|
| 6,415,226 | B1* | 7/2002 | Kozak | G01C 21/3461 340/988 |
| 2005/0096842 | A1* | 5/2005 | Tashiro | 701/210 |
| 2009/0005965 | A1* | 1/2009 | Forstall et al. | 701/201 |
| 2010/0076675 | A1* | 3/2010 | Barth | G01C 21/3469 701/532 |
| 2011/0040438 | A1* | 2/2011 | Kluge | G01C 21/3469 701/31.4 |
| 2011/0130956 | A1* | 6/2011 | Tracton et al. | 701/201 |
| 2011/0208416 | A1* | 8/2011 | Speier | G01C 21/3461 701/532 |
| 2012/0323485 | A1* | 12/2012 | Mutoh | G01C 21/3617 701/428 |
| 2013/0036139 | A1* | 2/2013 | Kung | G06Q 10/025 707/780 |
| 2015/0186609 | A1* | 7/2015 | Utter, II | A61B 5/0022 600/301 |

FOREIGN PATENT DOCUMENTS

| | | |
|---|---|---|
| EP | 0952557 A2 | 10/1999 |
| EP | 2337309 A1 | 6/2011 |
| JP | 2006322752 A | 11/2006 |
| WO | WO 2008/152396 A1 | 12/2008 |
| WO | WO 2013/014612 A1 | 1/2013 |

OTHER PUBLICATIONS

Sasank Reddy, et al., "Determining Transportation Mode on Mobile Phones", ISWC '08 Proceedings of the 12th IEEE International Symposium on Wearable Computers, 2008, (4 pages).

* cited by examiner

*Primary Examiner* — Mussa A Shaawat
*Assistant Examiner* — Abdhesh Jha
(74) *Attorney, Agent, or Firm* — Oblon, McClelland, Maier & Neustadt, L.L.P

(57) ABSTRACT

A transportation planner and route calculator for alternative travel methods that recommends alternative modes of transport relating to the preferences of the user. Recommendations draw upon preferences generated from the user's profile which is made up of inserted information from the user, travel historical log, a settings application and a method of auto adjusting the user's profile. A calculator unit retrieves one or more generated attributes of the user and obtains various related information such as available public transport, weather forecasts, historical travel log, to calculate travel options that best suit the users needs. The application constantly updates the users profile based on the users travel patterns and preferences, as the application learns more about the user the better the application becomes at recommending travel routes that suite the user's requirements.

17 Claims, 7 Drawing Sheets

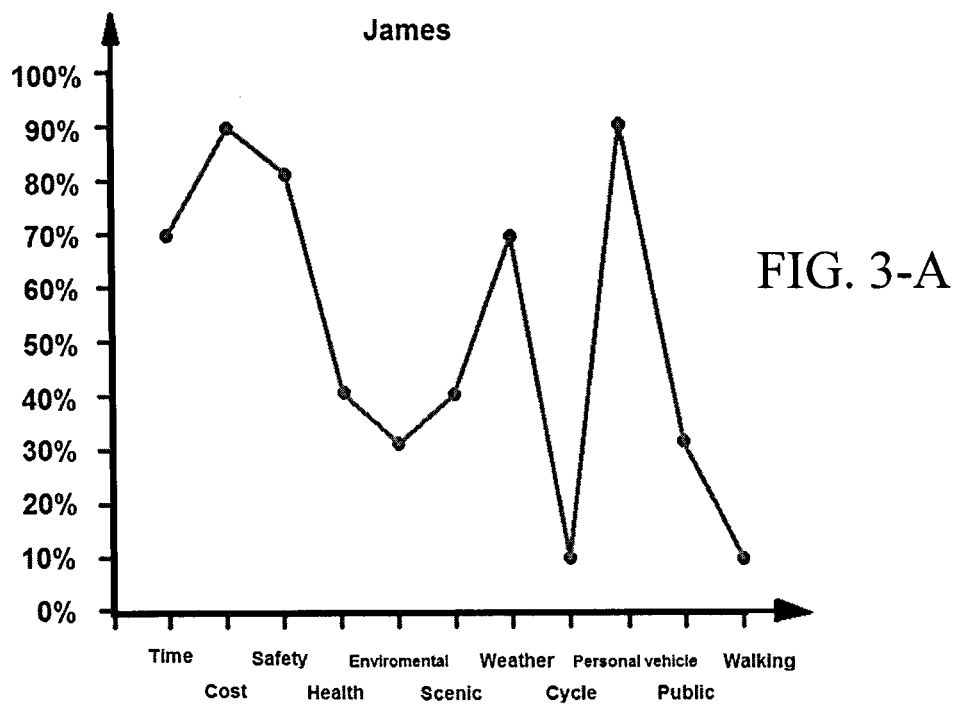
FIG. 3-A
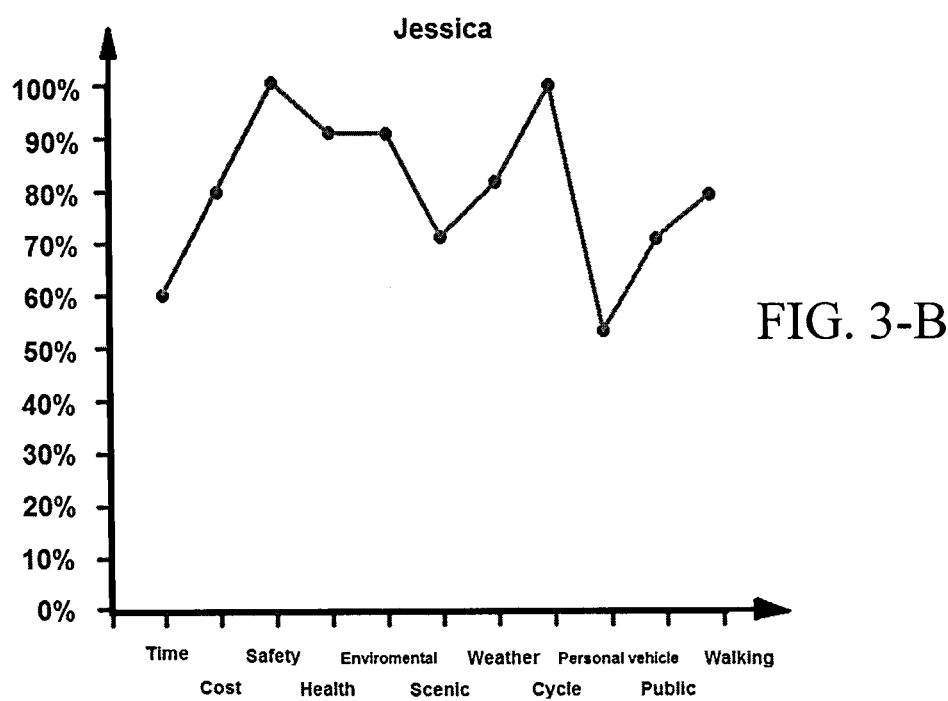
FIG. 3-B

TRANSPORTATION PLANNER AND ROUTE CALCULATOR FOR ALTERNATIVE TRAVEL METHODS

GRANT OF NON-EXCLUSIVE RIGHT

This application was prepared with financial support from the Saudi Arabian Cultural Mission, and in consideration therefore the present inventor has granted The Kingdom of Saudi Arabia a non-exclusive right to practice the present invention.

BACKGROUND

1. Field of the Disclosure

This disclosure relates to circuitry applications whereby travel algorithms are generated and collected to predict and recommend useful travel routes based on a set of criteria.

2. Description of the Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present disclosure.

Generating travel recommendations is a subject of great interest to many organizations, technology developers and consumers. Advising how someone should get from one place to another or where someone should go to achieve the scenic views or fitness aims, minimize their carbon foot print, save time or cost, etc., is an evolving science.

Whether the traveler knows where to go or not, a system that can identify travelers' needs and generate useful recommendations for methods of transport has proven to not only be useful to many, but also in demand. Such a system helps to save time and money and better-plan travel arrangements instantly wherever the person may be with the use of a portable wireless computer device or through a wired network.

SUMMARY

Lack of transportation information can cause travelers to not take full advantage of their travel experiences. In a time where being efficient with time and achieving multiple objectives simultaneously has become ever more important, having a sophisticated travel advisor can enhance a traveler's journey by introducing them to new places, whether they are scenic, touristic, historic or a good route to take to achieve fitness objectives. When travelling from one place to another, often people have varying concerns, the most common relate to accessibility and time. Other considerations such as cost and comfort also play a role when deciding which route or method of transport to take (e.g., whether a person is trying to decide whether to take public transport or private transport or a personal vehicle or a rented one).

However, now there are issues that people are becoming more and more concerned about, such as carbon footprint impact on the environment, their own fitness and general health. Much of the time the concerns of the traveler are based upon their personality. In light of this problem, a system that builds a profile of a user can predict the type of journey the traveler may want to take based on their personality. Information on the user can be collected though a number of techniques. For example, a profile application can be filled out by the user indicating their age, gender, weight, travel budget, their level of concern for their environmental impact, whether they use a vehicle and if they do the type of vehicle it is, etc. The inventors have recognized the advantages for a system that provides a detailed description of routes and the need to recommend alternative modes of transport with calculated attributes for every journey based on the user's personality profile. Additionally, the inventors have recognized the need for a filtration method to best provide the user with transportation recommendations that best fit their needs. In one or more embodiments according to the present disclosure, a travel planner and personalized route calculating device, that comprises circuitry configured to generate a user profile from including one or more of a questionnaire, a settings application, scheduling information, social network information, and a log of previous journeys made by the user. The device contains an automatic evaluation process that assess to what extent the generated recommendations are performed. The device generates a preference ranking for the following fitness, time, safety, cost, health, environmental, scenic, weather and mode of transport for the user. The device updates the user profile to include the preference rankings. Also a range of route recommendations are generated based on the criteria of the user profile, a current location of the user, localized transportation schedules and Traffic Demand Management options. The range of route recommendations include a separate recommendation corresponding to each category of the preference rankings and the circuitry is configured to select a route recommendation having a highest preference ranking and to control a display to output the selected route recommendation. The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3A and 3B show exemplary profile graphs that illustrate user profile preferences, according to certain embodiments;

DETAILED DESCRIPTION OF THE EMBODIMENTS

Figure 1:
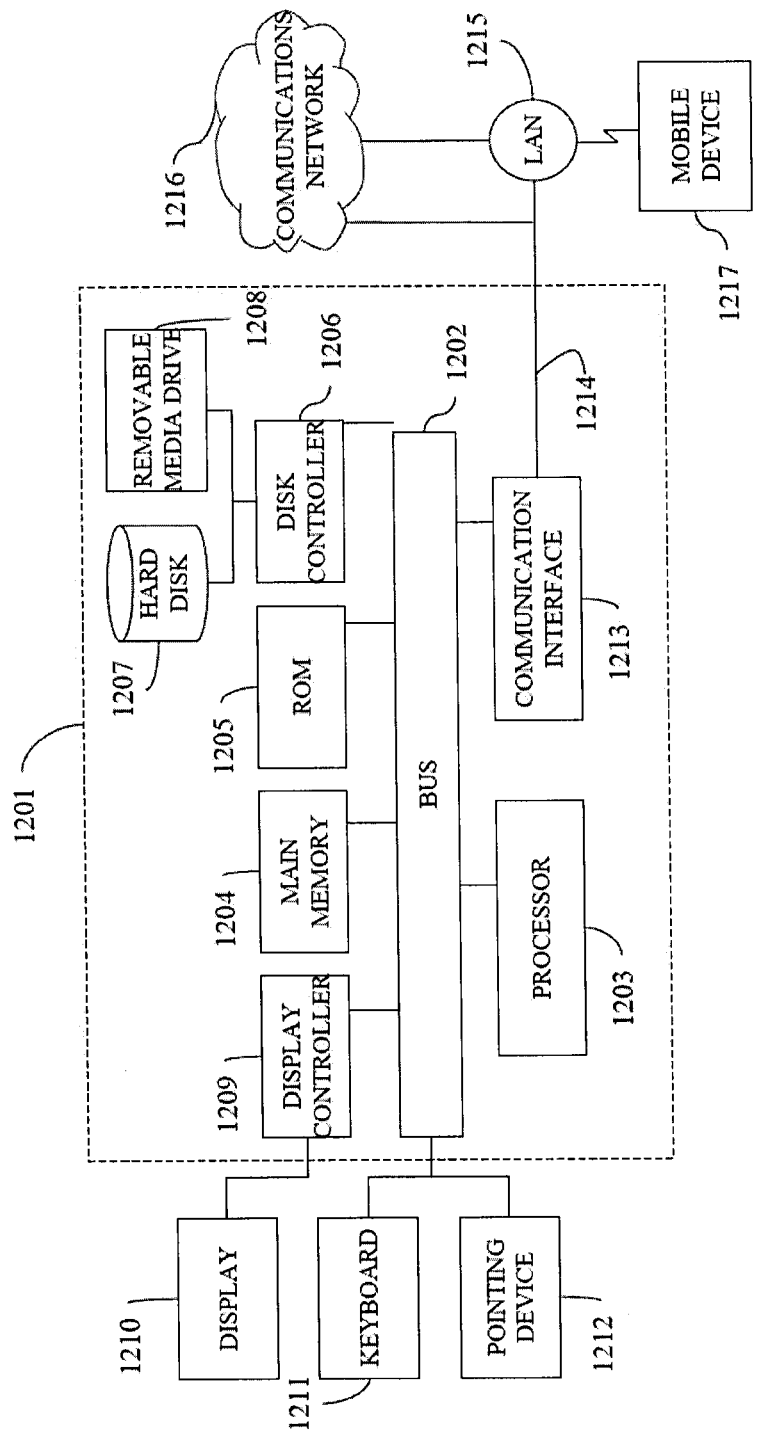
FIG. 1 is an exemplary block diagram of a hardware implementation, according to certain embodiments.

Referring now to the drawings, wherein like reference numerals designate identical or corresponding parts throughout the several views, FIG. 1 illustrates a travel planner device

1201 upon which an embodiment of the present disclosure may be implemented. Initially, it is noted that while the embodiment illustrated in FIG. 1 is directed to a computer-type device, one of ordinary skill in the art will appreciate that present disclosure may be easily adapted for implementation on other devices that include suitable processing circuitry. For example, one or more embodiments according to the present disclosure may be implemented on a smart phone, a portable navigation device, a tablet device, a laptop computer, or the like.

Referring to FIG. 1, the travel planner device 1201 includes a bus 1202 or other communication mechanism for communicating information, and a processor 1203 coupled with the bus 1202 for processing the information. The travel planner device 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The travel planner device 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The travel planner device 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the travel planner device 1201 using an appropriate device interface (e.g., small computer system interface (SCSI), integrated device electronics (IDE), enhanced-IDE (E-IDE), direct memory access (DMA), or ultra-DMA).

The travel planner device 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The travel planner device 1201 may also include a display controller 1209 coupled to the bus 1202 to control a display 1210, such as a liquid crystal display (LCD), for displaying information to a computer user. The computer system includes input devices, such as a keyboard 1211 and a pointing device 1212, for interacting with a user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the present disclosure in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the travel planner device 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Processing instructions according to the present disclosure may be stored on any one or on a combination of computer readable media, whereby the instructions may correspond to software for controlling the travel planner device 1201, for driving a device or devices for implementing the present disclosure, and for enabling the travel planner device 1201 to interact with a human user (e.g., print production personnel). Such software may include, but is not limited to, device drivers, operating systems, development tools, and applications software. Such computer readable media further includes the computer program product of the present disclosure for performing all or a portion (if processing is distributed) of the processing performed in implementing the present disclosure.

The computer code devices of the present disclosure may be any interpretable or executable code mechanism, including but not limited to scripts, interpretable programs, dynamic link libraries (DLLs), Java classes, and complete executable programs. Moreover, parts of the processing of the present disclosure may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The travel planner device 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Figure 2:
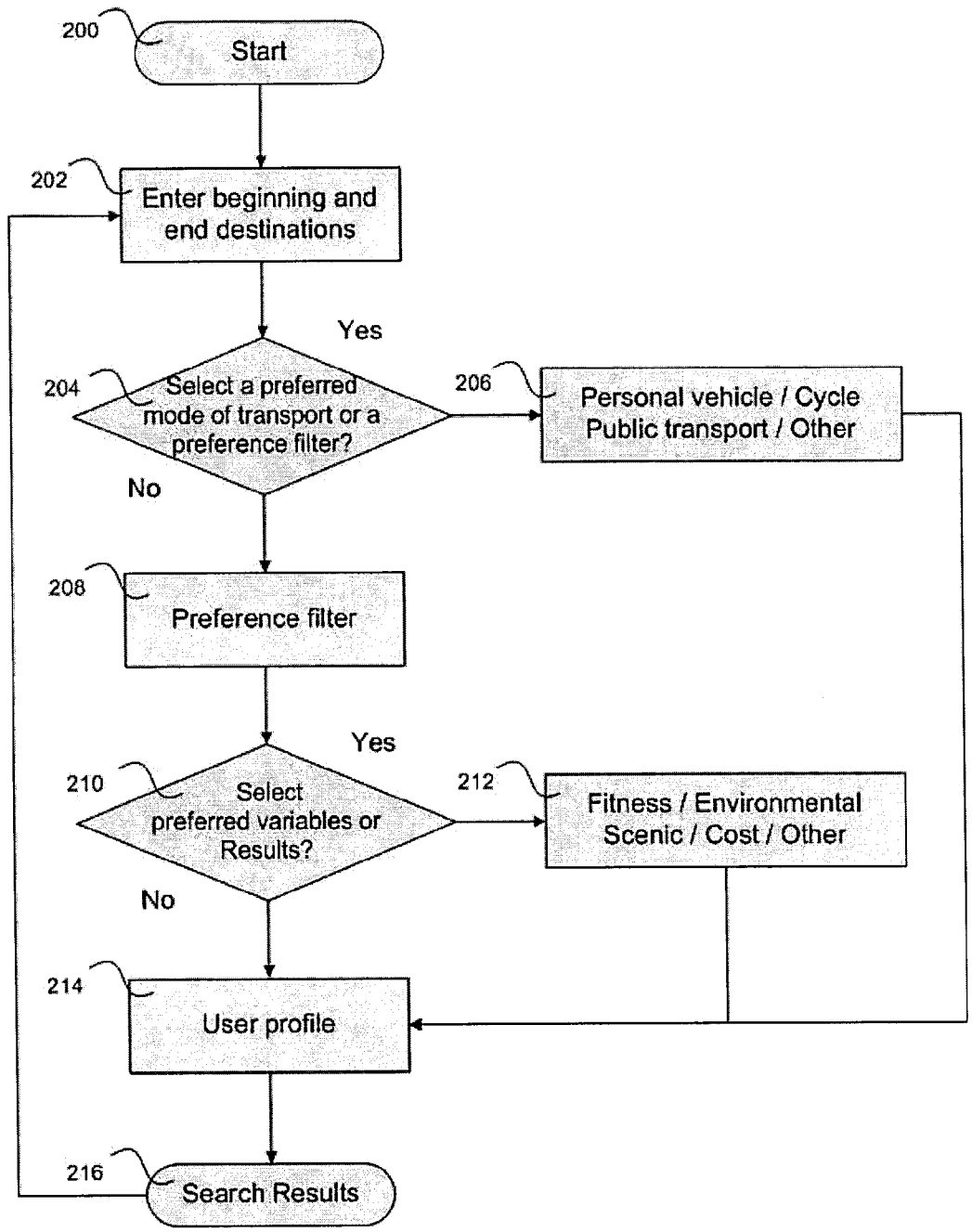
FIG. 2 is an exemplary flow chart of the interaction steps the user performs with the application, according to certain embodiments.

FIG. 2 is a flow chart that illustrates an exemplary process of generating route recommendation search results based on a user profile, according to certain embodiments. The order of the steps in the flow chart are not limited to the shown ordering, but rather the steps can be rearranged or customized to alternative user interaction formats. Moreover, the processing of FIG. 2 will be described herein in relation to the travel planner device 1201 of FIG. 1. However, it should be appreciated that the processing of FIG. 2 may be implemented on other devices that include processing circuitry.

The concept of processing illustrated in FIG. 2 is to generate travel alternatives for an individual to choose from, whereby the routes generated will be for an entered 'start' destination and a specified 'end' destination. The travel planner 1201 implementing the exemplary process of FIG. 2 has the ability to generate many different alternative ways of travelling with alternative modes of transport and effects from the travel.

The properties of a travel search can be displayed when a route of travel is highlighted. For example, if a person wants to travel from a destination A to a destination B and from their profile they have indicated that they aim to achieve a certain amount of fitness every day, the travel planner filter would use that attribute as a criteria for filtration. A filtration of travel methods can use a wide range of criteria, such as a frequency that the user opts to walk to a destination in lieu of other modes of transportation. Based on gathered data from the user's previous travel patterns (e.g., based on changes in geospatial coordinates during travel, based on explicit inputs to an interface, etc.), the travel planner 1201 can determine whether the individual actually walks or runs often.

Another attribute that the travel planner device 1201 can look up is the time of day, which can further inform processing related to generating route recommendations based on a user profile. For example, by determining the current time of day (i.e., the time a request for a route recommendation is received by the device), the travel planner device 1201 may determine whether it is usual for the user to be walking or running at this time or on this particular day. By generating and storing a historical log of the user's movements, the travel planner device 1201 can learn what the user's habits are and introduce incremental changes to their routines and methods of their travel. Also the travel planner device 1201 can monitor to what degree the user has implemented the suggestion of the program. Using that particular attribute the travel planner device 1201 can alter the degree it filters its results to the traveler.

Referring to FIG. 2, the process of generating route recommendations based on a user profile starts at step 200. In step 200, a main travel advisor interface that might be arranged with various options and graphics may be displayed on the display 1210. Following the initiation of the travel advisor interface on the display 1210, the processor 1203 at step 202 receives start and end points for a journey into the interface to enable the processor 1203 to pinpoint the coordinates on a map. In one or more embodiments, the start point may be determined based on a geospatial location input received from a radiolocation receiver such as a Global Positioning System (GPS), which may be included in the travel planner 1201.

At step 204, the processor 1203 and/or the display controller 1209 may control the display 1210 to display a prompt requesting a preferred mode of transport for the journey.

At step 206, the user has the option of selecting a preferred mode of transport which enables the processor 1203 to filter all the route recommendation results based on one or more particular modes of transport. The user may not have a preference on the type of transport and can opt to skip past this option and proceed to step 208.

At step 208, the processor 1203 calculates a number of options for the user based on a various attributes obtained from them. After the options are generated the processor 1203 at step 1210 can then sub-filter the results, or the processor 1203 may skip the step 210, based on a user input.

Should the user choose to filter the search results, the processor 1203 at step 212 will sub-filter the results based on various categorical user preference criteria. For example, in one or more embodiments, the processor 1203 may sub-filter the results based on criteria that are of some degree of importance to the user, such as fitness, cost, environmental concerns, etc. However, if the user is undecided or indifferent as to which criteria should be applied in sub-filtering the results, the processor 1203 can skip the option and opt to have the application generate results to which it calculates to be the best probability results for the user (step 214). All actions, selections, destinations, etc., relating to the user may be stored along with the user profile such that the stored data can be drawn upon when the travel planner device 1201 subsequently determines travel routes that will best suit the user. At step 16, results of the preceding processing are displayed on the display 1210.

Every filtered travel result to the user will have a list of all the known or calculated attributes, for example walking from point A to destination B will burn so many calories, (based on the travelers walk pattern which will be entered into the profile an average walk speed will be known) for the time it will take to walk the route, a reading of the environmental affects and a list of routes for scenic appreciation. Every generated result will have an algorithm of attributes built into it and will match the best result to the generated algorithm for the user.

When the user enters the beginning and end destinations 202 a process of calculation occurs, all the attributes are listed in order of what the systems calculates to be the most important attributes to the user. It is achieved by matching the best generated algorithm to the user profile algorithm, there are many over laying considerations to the user profile that can change the results of the generated search, such as selecting to have a preferred mode of transport 104 or selecting a preferred set of variables 114. The algorithm can be built on a median aggregation function that calculates the middle value for different attributes by using multiple observations of these attributes and then determine whether the user is following a plan that drives the user to achieve their goals or not. The user can specify the priorities for that particular mode of transport search 1106 i.e. bike routes, car routes, etc or preferred variables search 112. All the factors can be combined to develop a profile algorithm 114 for the user. The output of the aggregation function used in this algorithm is determined/calculated by association mining process. In case of a pre-built profile, a graph would be generated by applying the algorithm. It would have values for the attributes representing user's goals as well as the corresponding values for the attributes, which would be observations of the users actual travel behavior. For example, if the user walking goal is to burn 500 kcal/week but for example over the last 4 weeks the user burns only 300 kcal/week. The graph generated would show the actual versus the goal and then advise the user accordingly after performing the necessary calculations.

FIG. 3A is a graphical illustration of an initial algorithm generated from a profile filled in by a user of the system 'James'. James has indicated from his profile that when considering his journey, time is "important," that cost is "very important," safety is: important," health is "mildly considered," scenic journeys are "nice," that he has substantially "no interest in cycling," and that he relies primarily on his private vehicle and he is not a fan of walking or using public transport. The foregoing qualitative determinations may be made by analyzing information included in James' user profile and generating a score for each category (e.g., a preference percentage). The score may then be compared to predetermined threshold values corresponding to various levels of interest in a given category.

Based on the information in FIG. 3A, the travel planner device 1201 will know that James prefers to travel around in his car, and from this determination the travel planner device 1201 can ask (e.g., via a prompt in an interface) what vehicle or vehicles James uses on a regular basis. When the type of vehicle is entered, the travel planner device 1201 can query and obtain details of James' automobile (or other vehicle type, such as a motorcycle) from an online database. For example, the travel planner device 1201 may obtain information such as the vehicle's fuel consumption per mile, the cost of filling up the vehicle, the amount of carbon emissions it produces per mile and the carbon footprint it creates in every journey. Such information may, in one or more embodiments, may be accessed on a Web server connected to a network. In other embodiments, a database of vehicle information may be stored locally in the memory 1204.

In one or more embodiments, the travel planner device 1201 may also have access to real-time traffic information to generate more accurate times for travel and generate better route recommendations.

In one or more embodiments, data relating to previous journeys traveled by a user may be stored in a database after every journey. The information relating to the previous journeys may be accessed by the processor 1203 and the processor 1203 may control the display 1210 such that the information is plotted on a time graph so that the traveler can look up the amount of fuel and $CO_2$ emissions have been made from his journeys. Also, an estimated cost may be generated for each journey and all the journey cost estimations may be accumulated into a single report for the user to look up at any time. Also, at any point, the traveler can ask for advice on how they can adjust their travel results.

FIG. 3B is a graphical illustration of an initial algorithm generated from profile filled out by another user of the system 'Jessica'. As in the above example related to FIG. 3A, the processor 1203 may analyze information included in Jessica's user profile to determine relative preferences for a plurality of categorical aspects relating to the user and/or travel. For example, as illustrated in FIG. 3B, Jessica has indicated in her profile that time is a "relative" concern, cost is "important," safety is "paramount," she is "very concerned" about her health and fitness as well as her impacts on the environment, and scenic routes are "somewhat important." Jessica has indicated that cycling is her most preferred mode of transport, she also prefers not to use a personal vehicle, while public transport and walking is preferable. From Jessica's user profile further questions can be asked. For example, what is a maximum amount of time or distance that she prefers to spend cycling? Does she have fitness goals? What kind of bike does she ride (here there can be a generic list of bike types with allocated properties to choose from).

In one or more embodiments, the travel planner device 1201 can further prioritize search results with an entry attribute for filtration process criteria. For example, the processor 1203 may generate route recommendations by filtering results according to filtration criteria indicating the user prefers biking when possible. Accordingly, the processor may prioritize search results generated by processing described herein such that bike routes are prioritized with respect to routes related to other modes of transportation. In one or more embodiments, the processor 1203 may provide route recommendations only for the preferred mode of transport. The processor 1203 may control the display 1210 such that the recommended routes corresponding to the preferred mode of transport are listed in alphabetical order or numerical order. In other embodiments, the routes corresponding to the preferred mode of transport may be ordered based on secondary (or higher order) preferences such as scenic route preferences, points of interest along a route, weather, traffic, estimated calories burned, etc.

For bike or other physical travel options, each route suggested by the travel planner 1201 may include detailed lists of information relating to health benefits of a particular route. For example, the route recommendation can be broken down into calories burned, estimated target heart rate, blood pressure, muscle gain, etc. In one or more embodiments, the travel planner device 1201 may receive personal information corresponding to the user requesting the route recommendation (e.g., height, weight, age, gender, etc.). Accordingly, the processor 1203 may calculate estimated health benefits for a given route, and the route recommendations may be prioritized based on the estimated health benefit. Another health benefit criteria can be weight loss (e.g. What fat will be burned and/or areas of focus for the mode of travel—stomach, waist, legs, etc.). The processor 1203 can also further go onto what muscles might be gained; what muscles will be affected by the riding; the terrain that will be ridden; whether the rider is going uphill, downhill, or on a flat surface; or whether the route includes lots of stops or a continuous ride throughout the route. Any of the above health factors, alone or in any combination, may then be applied in providing route recommendations based on health benefit.

In one or more embodiments, the processor 1203 may compare the route fitness results with the daily fitness requirements or aims of the individual. As an option, in the profile or settings the person or user can determine what fitness level they are aiming for within their profile and a search will match where the routes that best fit within their fitness program, how the routes impact the user's daily fitness requirements, etc.

In one or more embodiments, the route recommendation processing may account for and/or include in the recommended route an indication as to where bikes can be rented, where bike racks are located for locking up, or where bikes can be purchased. For example, the processor 1203 may interface with an external server to determine a list of available city bike options, their locations and their prices. Such options include, for example, bike shares run by a municipality or third-party provider. In the case of bike shares, the processor 1203 may determine and output for display a list of what the fare plans are available in the bike share, the times of use and the penalties for not abiding by the rules or returning the bikes on time.

In one or more embodiments, the travel planner device 1201 can list travel options of how you can get to the locations from where the person is should they wish to get the bike, if they don't already have one. Other options other than bike share are local private bike rentals including services and the bike types they have. If information of services is not available then times of business and contacts should be available from an online database. Other information that could be added is the type of bikes available, and the times of rental could also be included, if available. Further, the processor 1203 may account for the time and actions needed to obtain a bike by incorporating, route suggestions and filtrations, route recommendations based on time, filter options based on time it takes to reach the destination, recommended routes for safety, etc., in the overall route recommendation for a journey.

In one or more embodiments, the processor 1203 may include aspects related to a user's preference for scenic routes as a filtration criterion. For example, the processor 1203 may analyze a user's profile to determine if the user has a high affinity for scenic routes, architecture, nature, tourist attractions, etc., and provide an option for recommended routes that include such features. Also route recommendations for tourist attractions filter what might be regarded as city attractions or interesting to the user based on their profile preferences and previous visited locations. For example art galleries, theater or any location of that nature can help the recommendation process, discovering your own city or a new city. These settings can be options within the program and they can be set at any point, new restaurants can be searchable by the user, clothes outlets, special offers, or any kind of shop or service outlet can also be incorporated into suggested route recommendations from the application programmable software.

Further, the processor 1203 may, in certain embodiments, interface with a scheduling program (e.g., a calendar capable of tracking appointments, schedules, etc.), and the user's upcoming schedule may be included as an input when determining when/if a scenic route is recommended. For example, the processor 1203 may determine, based on the user's calendar program, that the user has an appointment in the near future and therefore a longer, more scenic route—while normally preferred by the user—would not be appropriate for the current journey. Accordingly, the processor 1203 may filter longer, more scenic routes from being included in the recommendation output. Alternatively, the processor 1203 may assign a higher priority ranking to more direct, expedient routes while assigning lower priority rankings to scenic routes.

When the user selects a given recommended route in the display interface, the processor 1203 may control the display 1210 to output one or more of the following information: time to travel, fitness reading, environmental reading, how accommodating the selected route is for cycling. In one or more embodiments, the foregoing information may be displayed as a numerical rating, e.g., in the form of a percentage. Details can be given about the route if it is not accommodating (e.g., road work, construction, lack of cycle parks, etc.). This should be drawn from information of an online database that is frequently updated.

Figure 4:
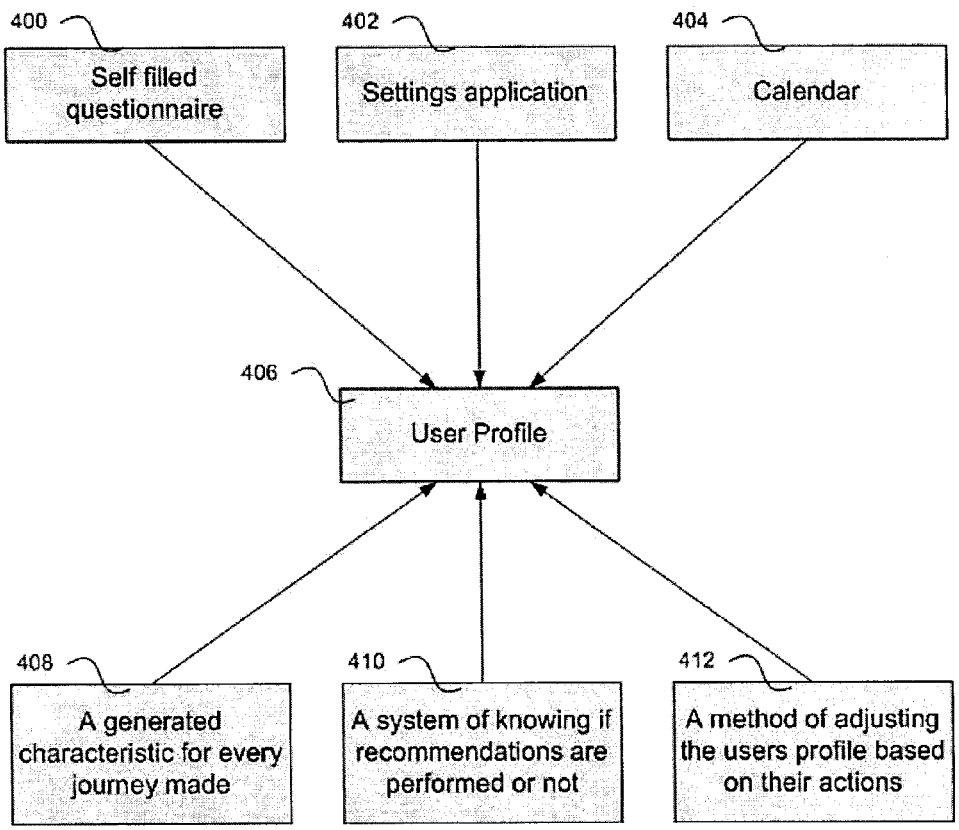
FIG. 4 is an exemplary graphical illustration of input criteria that build a user profile, according to certain embodiments.

Next, FIG. 4 illustrates an exemplary flow diagram for generating a user profile, according to certain embodiments. The exemplary flow diagram of FIG. 4 various inputs and criteria obtained and utilized by the processor 1203 when generating user profile 406. The various elements illustrated in FIG. 4 may be implemented by circuitry alone or in combination with any other processing element described herein. For example, the various elements described with respect to FIG. 4 may be implemented by the processor 1203 or by other processing circuitry, whereby instructions for performing the processing related to FIG. 4 may be included in the overall route recommendation processing instructions, or may be partially or fully stand-alone instructions accessed by the processor 1203 or other processing circuitry.

In one or more embodiments, the processor 1203 may generate the user profile based on information included in a self-filled questionnaire 400. For example, the user may be prompted to fill out the questionnaire 400 with personal details relating to health such as age, gender, height, weight, whether the person takes medication or uses any kind of mobility aid such as a wheel chair or a walking stick, etc. Additionally, the user may be prompted to fill out the questionnaire 400 with by responding to questions targeted at learning more about the user's habits, aims, preferences, targets, etc. Additionally, the user may be prompted to provide personal details and preferences relating to travel costs, fitness, environment, new exploration, scenic travel, touristic travel etc. In general, the questionnaire 400 will try to learn as much about the person as possible, such as whether they have a vehicle, how often they use it, the type vehicle they use, if it is the only vehicle they use, how often they exercise, where they do it, what their routine is etc.

In one or more embodiments, the processor 1203 may generate the user profile 406 based on a settings application 402. The setting application 402 may include a settings function for the profile, whereby it enables the user to change a number of elements of the user profile for different situations or circumstances. For example, based on user inputs into the settings application 402, the processor 1203 may determine if the user likes to ride when it rains, if the user is sick, whether to apply certain recommendations on certain days and others on different days, etc. There are a large number of alternative setting factors that can be applied in the settings application 402, the main attribute of the settings application 402 being that it enables the user to adjust the way the route recommendation processing works and how the results that are generated.

In one or more embodiments, the processor 1203 may generate the user profile 406 based on an input from a calendar 404. The calendar 404 allows the processor 404 to gain access to the user's calendar to determine upcoming appointments, upcoming events, a history of travel and/or events attended, etc. For example, by interfacing with the calendar 404, the processor 1203 can quickly assess the user's travel profile based on the calendar plans entered into the calendar. The calendar plans can be incorporated into the processing performed by the processor 1203 such that to the processor 1203 can create travel recommendations conditioned around the calendar data.

In certain embodiments, for every journey made the processor 1203 forms an assessment of the attributes of the journey based on an input from journey assessment section 408. For example, the journey assessment section 408 may determine how much the journey cost, how environmental the journey was, if it was the shortest route, etc., and the determination results may be output to the processor 1203 for inclusion in the route recommendation processing. Further, the determination result and other information relating to previous journeys may be stored in memory for use in future processing. In certain embodiments, these journey logs generated by the journey assessment section 408 may adjust the profile of the user and determine if the user is improving along the target they set or not.

In one or more embodiments, the processor 1203 may generate the user profile 306 based on an input from a recommendation performance determination section 410. The section 410 may recognize whether a user performs the recommendations the travel planner 1201 provides. For example, the processor 1203 may generate a route recommendation for the user and then determine and track whether the user takes action to accept the recommendation (e.g., based on an interface input to "start" turn-by-turn directions to the destination, based on GPS coordinates indicating the user took the recommended route to the destination, etc.). If the user does not perform (either wholly or in part) the recommendation provided by the processor 1203, then an assessment as to what degree did the user follow the recommendation may be performed by the processor 1203, which allows the processor 1203 to learn the user's tendencies and adapt the recommendation processing to better suit the user. Also, an assessment may be performed to determine know how often and for what reason the user deviates from the suggested recommendations, which allows the processor 1203 to adjust the profile 406 of the user.

In one or more embodiments, the processor 1203 may generate the user profile 306 based on inputs from a user action adjustment section 412. For example, based on an input from the user action adjustment section 412, the processor 1203 may prompt the user to re-adjust the aims and targets of the user to achieve more realistic results. The user action adjustment section 412 output may, for example, be a comparison result between information relating to goals, preferences, etc. provided by the user with information indicating actual actions of the user. For example, if the user states that fitness is a key priority yet the user never walks or bikes to nearby destinations, the processor 1203 may prompt the user to adjust the preferences or other user information (or the user profile may be adjusted automatically). All these elements are brought together to formulate an adequate profile for the user, to be able to be consistent with the needs and aims of that user and to be able to be up to date and accurate with the recommendations it provides.

Figure 5:
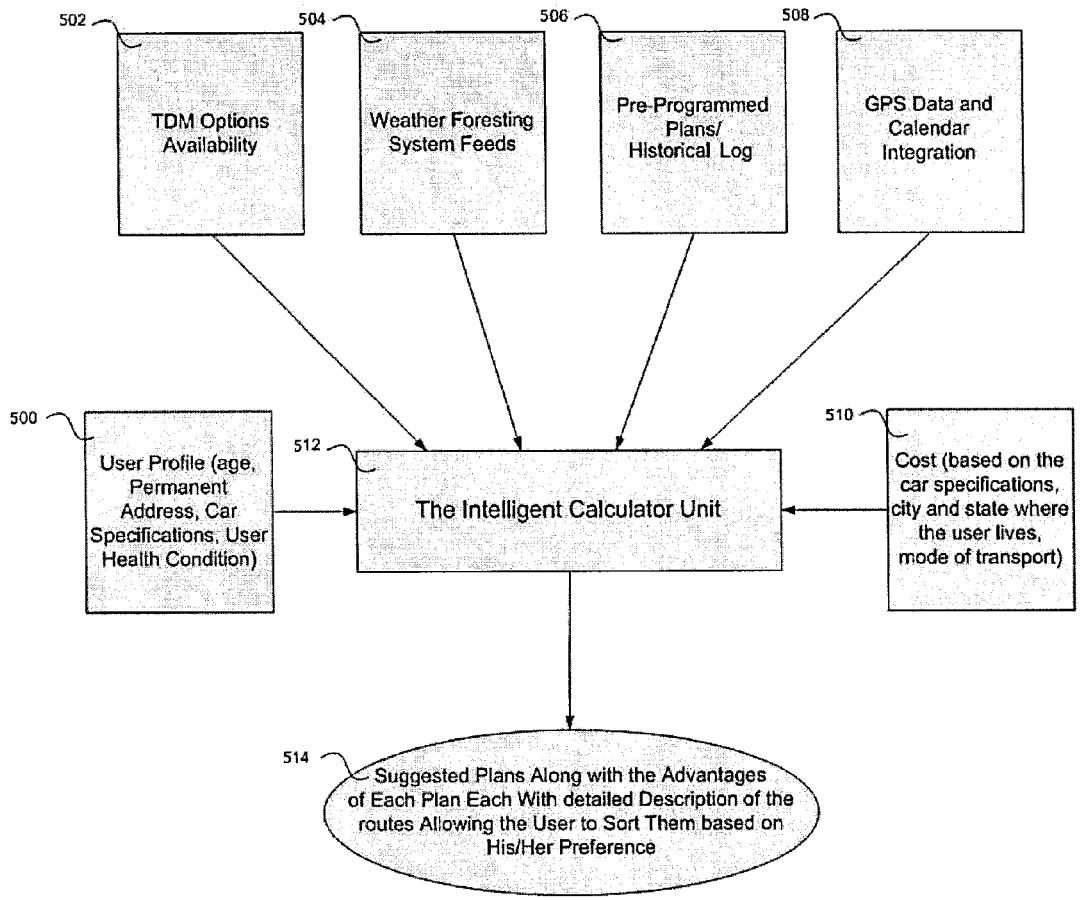
FIG. 5 is an exemplary graphical illustration of input factors that contribute to an intelligent calculator unit, according to certain embodiments.

FIG. 5 is an exemplary graphical illustration of input factors that contribute to an intelligent calculator unit, according to certain embodiments. In one or more embodiments, the intelligent calculator unit may be implemented by circuitry included in the processor 1203, or by other circuitry in communication with the processor 1203. As the processor 1203 gathers information from multiple sources to build an intricate profile for the user, the intelligent calculator unit 512 in FIG. 5 also obtains information from various sources to enable it to calculate the best recommendations for the user. The various input sources illustrated in FIG. 5 may be implemented as local processing and memory circuitry and/or as remote processing circuitry and storage accessed on a network (e.g., a server). The calculator 512 draws upon the user profile 500 discussed in FIG. 4 to obtain an estimate for the users preferences. After obtaining the user's profile, the calculator 512 draws upon a number of other information sources discussed below.

In one or more embodiments, the intelligent calculator unit 512 may receive inputs from Traffic Demand Management availability 502, which provides Traffic Demand Management information to know what travel options are available. This may include obtaining traffic travel times on road, accident information, delays, train and bus schedules, cycle routes, walking paths, car pooling information, etc.

In one or more embodiments, the intelligent calculator unit 512 may receive inputs from weather forecasting system feeds 504. For example, based on an input received from the weather forecasting system feeds 504, the intelligent calculator 512 may take weather forecasts into consideration when calculating travel plans for the user (e.g., a rainy day will not should not produce cycle recommendations unless the user sets it in the setting that it should discard certain weather conditions from affecting the cycling recommendations). Another example could be temperature—the intelligent calculator 514 may not recommend too much walking if the temperature is too high or driving on certain roads if the conditions are icy. The calculator takes the user profile to gauge the level weather resistance user has and their preferences when calculating travel recommendations for the user.

In one or more embodiments, the intelligent calculator unit 512 may receive inputs from a historical and future plans section 506. For example, the intelligent calculator unit may receive a historical travel log of the user's travel and can also obtain information from the user's calendar to enable the intelligent calculator unit 512 to formulate predictions of future travel modes and destinations useful to the user. The user can enter future travel plans into the system to help the system's accuracy in advance planning.

In one or more embodiments, the intelligent calculator unit 512 may receive inputs from GPS and calendar section 508. For example, the intelligent calculator unit 512 may receive geospatial inputs indicating a current position of the user, which enhances the information gathered when the system performs recommendation calculations. Based on location-specific information associated with the user's current location, the intelligent calculator unit 514 can assess what modes of transportation there are, costs, if there are any delays that may occur from on any specific route, etc. The "current" location of the user can also be matched with the user's calendar to obtain a record of the locations the user has been, to obtain a measurement of to what degree the calendar is followed, and to predict and suggest a future calendar routine for the user.

In one or more embodiments, the intelligent calculator unit 512 may obtain records of cost of the transportation options available to the user based on inputs received from cost determination section 510. For example, the costs of the buses and trains for various transportation routes can be obtained, bike share locations and cost, cost of fuel for the location and the vehicle consumption are just some examples of optional considerations that can be factored into the calculation for best predicting recommendations for the user.

When the various information described above has been gathered, the calculator 512 performs calculations using the user profile and all the elements related to the users current location to obtain plan suggestions, summarizing the advantages, various details such as health benefits, cost, time to travel, etc., thereby allowing the user to select a travel method of preference. The intelligent calculator unit 512 output is illustrated in section 514 of FIG. 5. The output of the intelligent calculator unit 512 may be sent to processor 1203, where the information obtained and processed by the intelligent calculator can by implemented for providing intelligent route recommendations to the user.

Figure 6:
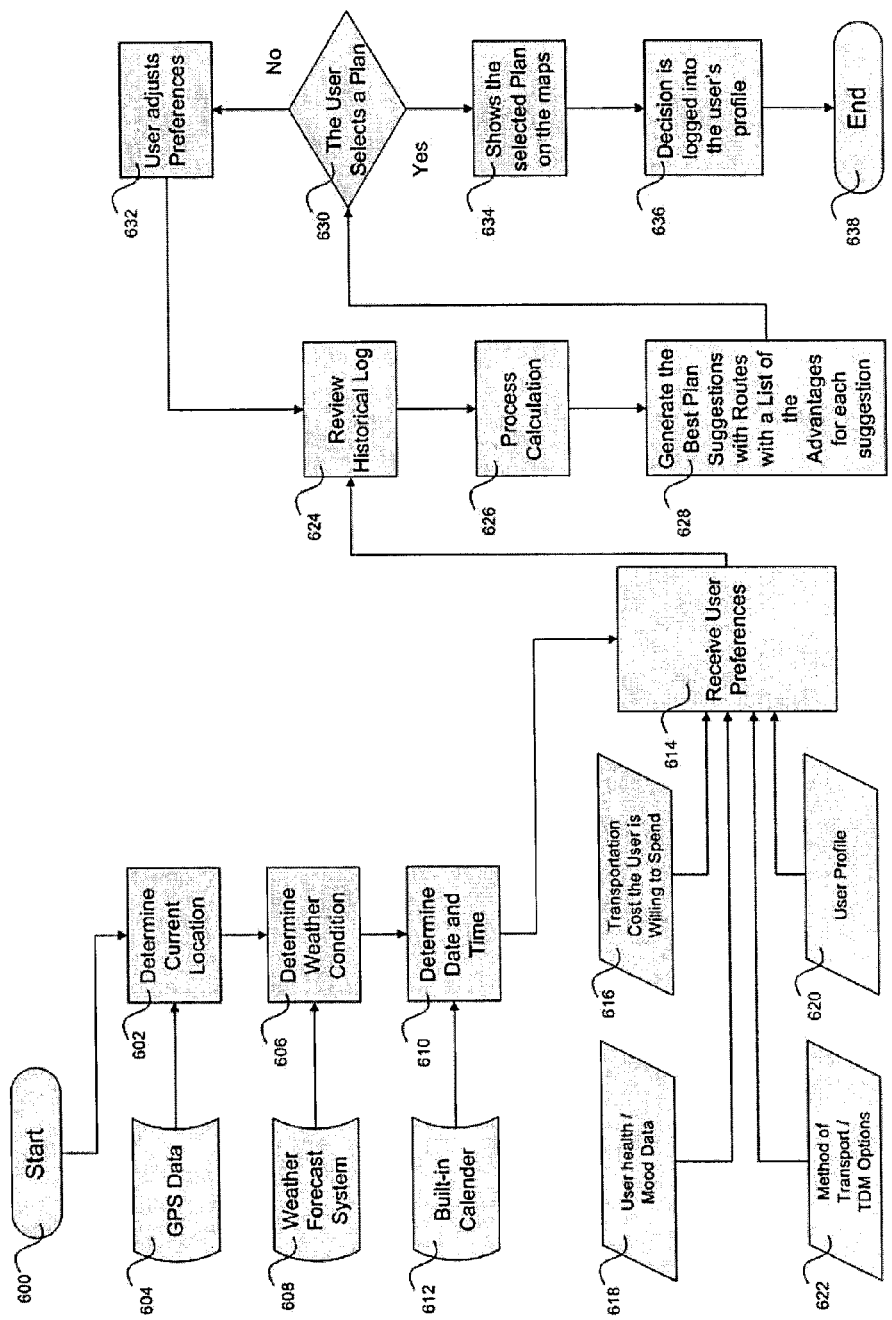
FIG. 6 is an exemplary flow diagram illustrating a method in which information is used to achieve recommendations for a user, according to certain embodiments.

Next, FIG. 6 illustrates an exemplary flow diagram illustrating a method in which information is used to achieve recommendations for a user, according to certain embodiments. For simplicity, the processing illustrated in FIG. 6 will be described with respect to the processor 1203 and the intelligent calculator unit 512.

At the start of the application process 600 the processor 1203 determines the current location of the user at step 602. In one or more embodiments, the processor 1203 draws upon GPS navigation data 604 to determine the global position of the individual at step 602.

At step 606, the processor 1203 determines the current weather condition and forecast for the duration of the proposed trip. In one or more embodiments, the processor 1203 draws upon information located in an online weather forecast system 608 when executing step 606.

At step 610, the processor 1203 determines the time and day (corresponding with the date) to retrieve transportation information to appropriately recommend travel suggestions to the user. In one or more embodiments, the processor 1203 retrieves information from a built in digital calendar 612 when executing the processing of step 610. This above-mentioned data is processed along with a number of other user preferences obtained from several sources at step 614. In one or more embodiments, the processor may receive an input from transportation cost and user preference data 616, user's health and mood data 618 gathered primarily from the users profile, available transportation and TDM options 622, and the overall user profile 620.

The user preferences received at step 614 are organized and a review of a historical log data is conducted at step 624. The results of the processing at step 624 are incorporated into the obtained data.

After all the data is collected and organized, the intelligent calculator unit 612, at step 626, processes the data to produce options for the user, as described in FIG. 5. In one or more embodiments, the intelligent calculator unit 512 produces a number of "best fit" options or recommendations for the user to choose from. For example, at step 628, the intelligent calculator unit 412 may include in each recommendation details of health benefits, environmental effects, cost, time, etc., associated with the recommended route. This detailed information allows the user to make an informed decision based on their preferences, needs, desires, etc., at a given time. The intelligent calculator 512 may also rank routes according to the categorical benefits of each route. For example, the intelligent calculator 512 may determine a current priority of health, cost, time, and environmental benefits related to the user. The intelligent calculator unit 512 may then output, based on the user's current priority rankings, one or more route recommendations that are best suited for the user, together with details indicating what the benefits of the route include.

At step 630, if the user selects a recommended route from the recommendations provided at step 628, then the route will appear on the map for the user to visually see at step 634. At step 636, the user's decision is then logged in the memory 1204, where it can be later applied to help build the user's profile 504 for future recommendations.

At the end of the travel, the processor 1203 and/or intelligent calculator 512 may perform a check to register to what degree the user followed the advice of the application. For example, if the user does not select a recommended travel route at step 630, then the processor 1203 can prompt the user to adjust the user preferences at step 632, these might be more short term preferences to do with a particular location or situation of the user. When these preferences are set; the process repeats from step 624 to produce a new set of recommendations for the user.

As discussed herein, the transportation planner and intelligent calculator are used to help users to optimize their travel journeys to get benefits that better serve their needs for every trip they make. An algorithm aiding the calculation of best route draws from the collected information from the user's historical travel, profile, goals, etc. The algorithm may be structured on a median aggregation function that calculates the middle value for different attributes by using multiple observations of these attributes and then determining whether the user is following a plan that drives the user to achieve the set goals or not. The attributes mentioned include preferences related to: time, cost, health, safety, environmental, scenic, weather, cycle, personal vehicle, public transportation, and walking. Further attributes can be added it to the overall application. In one or more embodiments, the output of the aggregation function used in this algorithm may be calculated by a Chi-Square test.

In a case of the availability of a pre-built user profile, a graph may be generated by applying the Chi-square algorithm, which would have values for the attributes representing user's goals, preferences, etc., as well as corresponding values for the user's attributes, which are observations of the user's travel patterns. For example, if the user's walking goal is to burn 500 kcal/week but actually over the last 4 weeks the user burns only 300 kcal/week. The graph generated would show the actual versus the goal and then advise the user accordingly after doing the calculations as mentioned earlier. In a case where the user chooses not to build a profile, the graph that would generate applying the algorithm will have estimated values for the attributes representing the user's actions over a 4 week time period. The graph will also contain corresponding changing values (either increasing or decreasing) for the attributes representing the user's unusual travel behavior. For example, if the user usually cycles 10 miles/week from the start of using the program, but over the last month user only cycles 2 miles/week, the graph that would generate would show the historical values against the recent observations. The application would then recommend a number of options to the user after formulating a number of calculations. For example, upon recognizing discrepancies between a desired or typical pattern of user behavior and the actual behavior exhibited by the user, the discrepancy may be illustrated by the graph, and a recommendation may be provided for resolving the discrepancy.

By monitoring the user's movements, the travel planner device 1201 can also provide the user with recommendations containing certain offers and destinations that the user may appreciate based on their travel patterns. For example, if a user usually goes hiking during weekends and cycles through parks, that means the value of his scenic attribute is high and that user has a high probability that they might appreciate recommendations for new cycle routes and locations for hiking nearby. Based on that determination, the travel planner device 1201 provides the user with information about new destinations nearby user's usual locations on the weekend. Over time as the user continues to use the travel planner device 1201, it will be able to provide more accurate and relevant predictions for the user based on continuous refinements of the user's profile.

The travel planner device 1201 allows the user to build pre-defined plans based on both their weekday and weekend routines, it is then able to suggest improvements to the values of the important attributes contributing to achieve the user's goals. For example, assume the user enters information indicating that in their weekday plan they drive from home to their job and that they like to arrive early to their destination. If the route that is driven through usually experiences high traffic volumes in the morning, the travel planner device 1201 will learn the user's movements over time and suggest better routes or other transport methods (e.g. metro) to help the user shorten the travel time and consequently achieve a better travel experience.

In one or more embodiments, the travel planner device 1201 may have access to other user information through any number of other programs or applications. For example, the travel planner device 1201 may have access to a social network profile such as Facebook or Twitter, and would have the ability to withdraw such information as preference of music the user prefers or types of food, destinations, etc., and then match that with the user's current location to recommend attending (e.g., a music concert).

The travel planner device 1201 may implement a number of methods for obtaining information about the user. One is a self-filling profile that queries the user with a number of questions to obtain crucial information about the user's aims and habits. Another is by obtaining user information via social network profiles and auto-profile information options. The self-filling profile obtains basic information about the user (e.g. age, gender, height . . . etc.), and is created by the user when the user starts using the program. The auto-profile is an important part of the application that enables it to obtain useful information about the user in order to know enhance the travel advice for the user. The application features a method for updating the profile based on the users' actions, it continually adjusts attributes depending on various different circumstances, such as weather conditions, whether previous recommendations were acted on/or might have been considered or which recommendation (if any) was taken $1^{st}$, $2^{nd}$, $3^{rd}$, etc. The application adjusts itself to what level of improvement the user has undertaken and to what degree the user has applied its recommendations.

A primary objective of the travel planner device 1201 is supporting users with their travel plans by characterizing their preferences, and helping them by quickly locating and recommending places, offers, and journeys they would appreciate. The travel planner device 1201 may use an algorithm that aids continuous analysis of data generated by sensors located in most mobile devices. The algorithm identifies the emerging patterns in user behavior, analyzes it and adjusts its decisions/recommendations accordingly in real-time. Data generated through the program is gathered through the user's mobile device and sent through a stream to a remote server to be stored into a local database. Data for both actual and expected observations may be periodically analyzed (weekly) by using the Chi-Square test.

The difference of proportions (deviation) method is very powerful for estimating the user effectiveness of following a suggested plan/action toward achieving his goals. However, using the Chi-Square test in accordance with the present disclosure is intended to test how likely a user would follow the program recommendations based on his/her historical activities. In other words, it examines how likely it is that an observed distribution (for a specific attribute) is due to chance. It is also called a "goodness of fit" statistic, because it measures how well the observed distribution (actual) of data fits with the distribution that is expected. For example, to start a Chi-Square sample data be obtained as illustrated in Table 1-1. The example of this simple table represents all attributes with two outcomes based on day type (e.g., weekday or weekend). The table also illustrates the total values for each column and row—that is, the total number of weekday and weekend observations (each column) and the total number of observations for each individual attribute (each row).

TABLE 1-1

| Attribute | Weekday | Weekend | Total |
| --- | --- | --- | --- |
| Time | 100 | 70 | 170 |
| Cost | 90 | 80 | 170 |
| Safety | 100 | 80 | 180 |
| Health | 40 | 80 | 120 |
| Environmental | 60 | 80 | 140 |
| Scenic | 30 | 85 | 115 |
| Weather | 60 | 95 | 155 |
| Cycle | 30 | 70 | 100 |
| Personal Vehicle | 90 | 20 | 110 |
| Public | 30 | 70 | 100 |
| Total | 630 | 730 | 1360 |

An example of how to calculate Chi-Square with this example data is firstly to calculate the expected results based on the actual user behavior to find the association between an attribute and the day type. This will help the travel planner device 1201 recommend certain routes or destinations. To calculate the expected observations, it is assumed that the data of the rows and columns are independent. To obtain the expected observation to the 100 rate for time (at top left of the table values), the row total (170) and column total (630), is multiplied, and then divided by the overall total (1360). So that the expected observation value is:

$$(170 \lambda 630)/1360 = 78.75 \approx 79$$

The same calculation is applied for each cell in the table by applying the following formula:

$$(\text{row total} * \text{column total})/1360$$

The expected value shows how the data would break up if there were no differences between the attributes. Table 1-2 shows the expected values for each of the 20 cells.

The second step is to calculate the deviation. Table 1-2 also includes the deviation, which is the difference between the observed value and the expected value. In this case, the deviations all have the same value, but with different signs. This is because the original data has 10 rows and 2 columns. The deviation in each row and each column always cancel out, so the sum of the deviation in each row and each column is always 0.

TABLE 1-2

Calculation of the Expected Values and Deviations for data in table 1-1

| | Actual Observations | | | Expected Observations | | Deviation | |
|---|---|---|---|---|---|---|---|
| | Weekday | Weekend | Total | Weekday | Weekend | Weekday | Weekend |
| Time | 100 | 70 | 170 | 79 | 91 | 21.25 | −21.25 |
| Cost | 90 | 80 | 170 | 79 | 91 | 11.25 | −11.25 |
| Safety | 100 | 80 | 180 | 83 | 97 | 16.62 | −16.62 |
| Health | 40 | 80 | 120 | 56 | 64 | −15.59 | 15.59 |
| Environmental | 60 | 80 | 140 | 65 | 75 | −4.85 | 4.85 |
| Scenic | 30 | 85 | 115 | 53 | 62 | −23.27 | 23.27 |
| Weather | 60 | 95 | 155 | 72 | 83 | −11.80 | 11.80 |
| Cycle | 30 | 70 | 100 | 46 | 54 | −16.32 | 16.32 |
| Personal Vehicle | 90 | 20 | 110 | 51 | 59 | 39.04 | −39.04 |
| Public | 30 | 70 | 100 | 46 | 54 | −16.32 | 16.32 |
| Total | 630 | 730 | 1360 | | | | |

The third step is to calculate Chi-Square values for all cells and then for the entire table. To calculate a Chi-Square value for a cell, the deviation is squared and then is divided by the expected as shown below:

$$\text{Chi-Square}(x) = (x - \text{expected}(x))^2 / \text{expected}(x)$$

To calculate the Chi-Square value for the entire table, the degrees of freedom (df) is required as it is what Chi-Square depends on. The idea behind the degrees of freedom is to determine how many different variables are needed to describe the table of expected values. For example, an estimate of the variance based on a sample size of 100 is based on more information than an estimate of the variance based on a sample size of 5. The degrees of freedom (df) of an estimate is the number of independent pieces of information on which the estimate is based.

The number of degrees of freedom in a table is calculated by subtracting 1 from the number of rows and from the number of columns and multiplying them together. The degrees of freedom in this example are:

$$(10-1)(2-1) = 9*1 = 9$$

The number tells us that 9 attributes out of the 10 can vary in values without affecting the significance of the Chi-Square test. After calculating the degrees of freedom, we can now calculate the overall Chi-Square value for the entire table as shown in Table 1-4. Note: for calculation purposes, numbers for 100s are reduced to 10s.

TABLE 1-3 shows the Chi-Square values for all cells.

| | Actual Observations | | | Expected Observations | | Deviation | | Chi-Square | |
|---|---|---|---|---|---|---|---|---|---|
| | Weekday | Weekend | Total | Weekday | Weekend | Weekday | Weekend | Weekday | Weekend |
| Time | 100 | 70 | 170 | 79 | 91 | 21.25 | −21.25 | 5.73 | 4.95 |
| Cost | 90 | 80 | 170 | 79 | 91 | 11.25 | −11.25 | 1.61 | 1.39 |
| Safety | 100 | 80 | 180 | 83 | 97 | 16.62 | −16.62 | 3.31 | 2.86 |
| Health | 40 | 80 | 120 | 56 | 64 | −15.59 | 15.59 | 4.37 | 3.77 |
| Environmental | 60 | 80 | 140 | 65 | 75 | −4.85 | 4.85 | 0.36 | 0.31 |
| Scenic | 30 | 85 | 115 | 53 | 62 | −23.27 | 23.27 | 10.17 | 8.77 |
| Weather | 60 | 95 | 155 | 72 | 83 | −11.80 | 11.80 | 1.94 | 1.67 |
| Cycle | 30 | 70 | 100 | 46 | 54 | −16.32 | 16.32 | 5.75 | 4.96 |
| Personal Vehicle | 90 | 20 | 110 | 51 | 59 | 39.04 | −39.04 | 29.92 | 25.82 |
| Public | 30 | 70 | 100 | 46 | 54 | −16.32 | 16.32 | 5.75 | 4.96 |
| Total | 630 | 730 | 1360 | | | | | | |

TABLE 1-4

Final Chi-Square Calculation

| O | E | O − E | $|O - E|^2/E$ |
|---|---|---|---|
| 10 | 7.9 | 2.1 | 0.558 |
| 7 | 9.1 | −2.1 | 0.485 |
| 9 | 7.9 | 1.1 | 0.153 |
| 8 | 9.1 | −1.1 | 0.133 |
| 10 | 8.3 | 1.7 | 0.348 |
| 8 | 9.7 | −1.7 | 0.298 |
| 4 | 5.6 | −1.6 | 0.457 |
| 8 | 6.4 | 1.6 | 0.400 |
| 6 | 6.5 | −0.5 | 0.038 |
| 8 | 7.5 | 0.5 | 0.033 |
| 3 | 5.3 | −2.3 | 0.998 |
| 8.5 | 6.2 | 2.3 | 0.853 |
| 6 | 7.2 | −1.2 | 0.200 |
| 9.5 | 8.3 | 1.2 | 0.173 |
| 3 | 4.6 | −1.6 | 0.557 |
| 7 | 5.4 | 1.6 | 0.474 |
| 9 | 5.1 | 3.9 | 2.982 |

TABLE 1-4-continued

Final Chi-Square Calculation

| O | E | O – E | \|O – E\|^2/E |
|---|---|---|---|
| 2 | 5.9 | –3.9 | 2.578 |
| 3 | 4.6 | –1.6 | 0.557 |
| 7 | 5.4 | 1.6 | 0.474 |
| | | Total | 12.750 |

O: Observed (actual) value
E: Expected value

Because the Chi-Square value is greater than the degrees of freedom, it is concluded that the day type (weekend, weekday) does affect the performance of the user and reject the null hypothesis. This leads the program to advise the user effectively on daily basis to help the user achieve desired goals.

Figure 7:
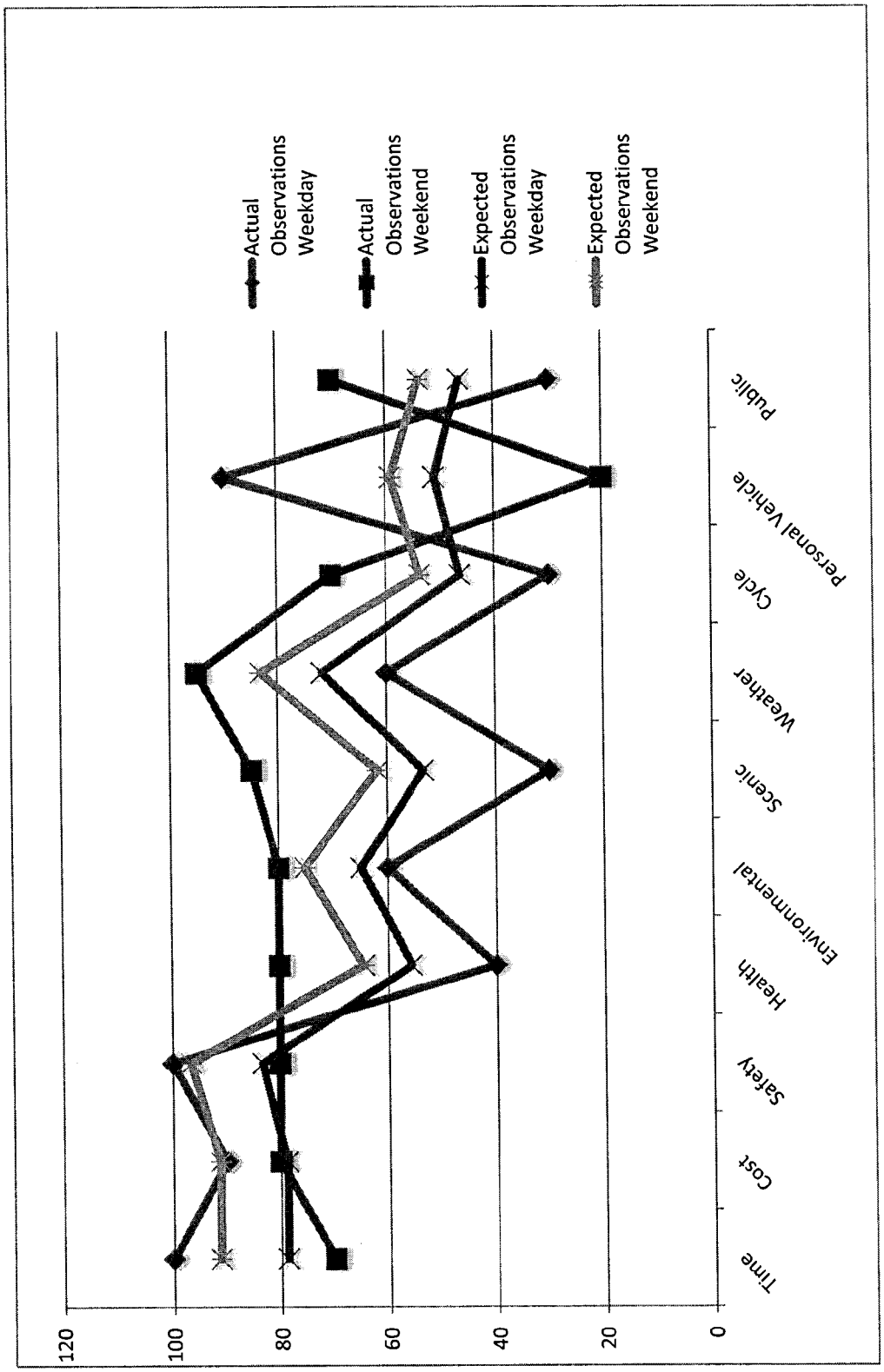
FIG. 7 is an exemplary graphical representation of actual observations that represent a user's existing routine, according to certain embodiments.

FIG. 7 is an exemplary graphical representation of actual observations that represent a user's existing routine, according to certain embodiments. The actual observations represent the existing user routine that is captured by the auto profile. It shows the expected observations represent the predicted results based on the historical behavior. This represents the threshold the user should maintain in order to achieve set goals. Using median aggregation function on the weekly observations and comparing it to the values in the user attributes enables the travel planner device 1201 to determine how well is the user performs to achieve their goals.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The invention claimed is:

1. A travel planner and personalized route calculating device, comprising:
   circuitry configured to generate a user profile from at least one of a questionnaire, a settings application, scheduling information, social network information, and a log of previous journeys made by the user,
   a global positioning system configured to determine a current location of the user,
   generate a plurality of route recommendations based on the generated user profile, the current location of the user, localized transportation and Traffic Demand Management options,
   generate a preference ranking based on the generated user profile, environmental information, health information and at least one of fitness information, a time, safety information, a cost, scenic information, weather information, a mode of transport for a user, and one of a first type of day and a second type of day, wherein the first type of day is a weekday and the second type of day is a weekend,
   and update the user profile to include the preference ranking, wherein the plurality of route recommendations include a separate recommendation corresponding to each category of the preference rankings, and wherein the circuitry is configured to select a route recommendation having a highest preference ranking and to control a display to output the selected route recommendation,
   wherein the circuitry determines a degree to which the user follows the route recommendation having the highest preference ranking and updates the user profile based on the determination, wherein the environmental information is information indicating a carbon footprint of one or more route recommendations, and wherein the health information indicates the health benefits to the user of one or more route recommendations,
   wherein the generating of the preference ranking is an algorithm based on a median aggregation function that calculates a middle value for different attributes by using multiple observations from the user profile attributes, and wherein the algorithm computes an expected observation for each attribute corresponding to the first type of day and the second type of day, and determines, based on the type of day, a degree to which the user follows the recommended route by computing a deviation between the expected observation of each attribute and an actual observation of the attribute and computing a chi-square value for each attribute, and wherein the circuitry is further configured to compute a degree of freedom parameter corresponding to all attributes, the degree of freedom parameter corresponding to a significance of the computed chi-square values of the attributes.

2. The travel planner and personalized route calculating device in claim 1, wherein a number of options for a journey are generated based on a user profile algorithm that matches closest to a journey algorithm and are displayed in order of best match.

3. The travel planner and personalized route calculating device of claim 1, wherein the circuitry is further configured to generate, a settings configuration that allows the user to further calibrate search results based on additional customizable attributes.

4. The travel planner and personalized route calculating device of claim 1, wherein the circuitry is further configured to receive an input indicating a desired mode of transport, and filter the plurality of route recommendations based on the desired mode of transport and a priority setting corresponding to the desired mode of transport, wherein the priority setting is included in the user profile.

5. The travel planner and personalized route calculating device of claim 1, wherein integrated in the user profile are one or more sets of customizable targets and aims for the user to achieve.

6. The travel planner and personalized route calculating device of claim 2, wherein the circuitry is further configured to display one or more variable readings for one or more journeys.

7. The travel planner and personalized route calculating device of claim 3, wherein examples of one or more additional customizable attributes in the settings configuration are selected from the group consisting of preference filtration results based on weather conditions, time of day, day of the week, fitness aims, and environmental aims.

8. The travel planner and personalized route calculating device of claim 1, wherein the algorithm forecasts and recommends travel plans relating to the user profile preferences and actual travel patterns.

9. The travel planner and personalized route calculating device of claim 8, wherein forecasted and recommended travel plans retrieve assigned expected values from the individual profile attributes.

10. The travel planner and personalized route calculating device of claim 7, wherein previously visited locations are registered and closely matched with previously visited location outlets and events are recommended through a graphical map interface.

11. The travel planner and personalized route calculating device of claim 1, wherein the circuitry generates the preference ranking further based on the fitness information, the time, the safety information, the cost, the scenic information, the weather information, and the mode of transport for a user.

12. The travel planner and personalized route calculating device of claim 11, wherein the fitness information indicates calories burned and weight loss for one or more of the route recommendations.

13. The travel planner and personalized route calculating device of claim 11, Wherein the cost indicates cost information for each of a plurality of different transportation options for one or more route recommendations.

14. The travel planner and personalized route calculating device of claim 1, wherein the circuitry is further configured to identify, based on the user profile, a type of vehicle the user uses regularly, identify, as a function of the type of vehicle, fuel consumption metrics, a cost of filling up the vehicle with gas, and the environment information, and generate the preference ranking further based on the fuel consumption metrics and the cost of filling up the vehicle.

15. The travel planner and personalized route calculating device of claim 1, wherein at least one of the route recommendations includes destinations determined as a function of the health information.

16. The travel planner and personalized route calculating device of claim 1, wherein at least one of the route recommendations includes a mode of transport determined as a function of the health information.

17. A travel planner and personalized route calculating device, comprising:
   circuitry configured to generate a user profile from at least one of a questionnaire, a settings application, scheduling information, social network information, and a log of previous journeys made by the user,
   a global positioning system configured to determine a current location of the user,
   generate a plurality of route recommendations based on the generated user profile, the current location of the user, localized transportation and Traffic Demand Management options,
   identify, based on the user profile, a type of vehicle the user uses regularly,
   identify, as function of the type of vehicle, fuel consumption metrics, a cost of filling up the vehicle with the gas, and the environment information,
   generate a preference ranking based on the generated user profile, environmental information, health information and at least one of fitness information, a time, safety information, a cost, scenic information, weather information, a mode of transport for the user, the fuel consumption metrics, the cost of filling up the vehicle with gas, and one of a first type of day and a second type of day, wherein the first type of day is a weekday and the second type of day is a weekend,
   and update the user profile to include the preference ranking, wherein the plurality of route recommendations include a separate recommendation corresponding to each category of the preference rankings, and wherein the circuitry is configured to select a route recommendation having a highest preference ranking and to control a display to output the selected route recommendation,
   wherein the circuitry determines a degree to which the user follows the route recommendation having the highest preference ranking and updates the user profile based on the determination, wherein the environmental information is information indicating a carbon footprint of one or more route recommendations, and wherein the health information indicates the health benefits to the user of one or more route recommendations,
   wherein the generating of the preference ranking is an algorithm based on a median aggregation function that calculates a middle value for different attributes by using multiple observations from the user profile attributes, and wherein the algorithm computes an expected observation for each attribute corresponding to the first type of day and the second type of day, and determines, based on the type of day, a degree to which the user follows the recommended route by computing a deviation between the expected observation of each attribute and an actual observation of the attribute and computing a chi-square value for each attribute, and wherein the circuitry is further configured to compute a degree of freedom parameter corresponding to all attributes, the degree of freedom parameter corresponding to a significance of the computed chi-square values of the attributes.

* * * * *